United States Patent [19]

Berry et al.

[11] 3,799,220
[45] Mar. 26, 1974

[54] APPARATUS FOR ASEPTIC PACKING OR CONDITIONING OF PRODUCTS, NOTABLY FOOD PRODUCTS

[75] Inventors: Jean-Luc Berry, Mesnil sur L'Estree; Edgar J. Dardaine, Sorel-Moussel, both of France

[73] Assignee: E. P. Remy et Cie, Dreux, France

[22] Filed: Aug. 5, 1971

[21] Appl. No.: 169,171

[30] Foreign Application Priority Data
Aug. 7, 1970 France ........................... 70.29313

[52] U.S. Cl. ............... 141/46, 99/453, 141/98, 141/102, 141/146, 259/3, 277/14
[51] Int. Cl. ....... B67d 5/02, B67d 5/62, F16j 15/14, F16j 15/42
[58] Field of Search .......... 141/1, 46, 98, 102, 145, 141/146; 277/13-14; 99/252, 453; 259/3

[56] References Cited
UNITED STATES PATENTS

| | | | |
|---|---|---|---|
| 2,760,704 | 8/1956 | Fechheimer | 141/145 X |
| 3,079,133 | 2/1963 | Wilsman | 259/3 |
| 3,105,335 | 10/1963 | Hickey | 99/252 X |
| 2,544,423 | 3/1951 | Goddard | 277/13 X |
| 2,675,951 | 4/1954 | Oriol | 141/46 |
| 2,325,283 | 7/1943 | Swearingen | 277/13 X |
| 3,491,503 | 1/1970 | Ashton | 141/1 X |
| 3,457,968 | 7/1969 | Tuma | 141/102 X |
| 2,698,120 | 12/1954 | Fairchild | 99/453 X |
| 3,166,107 | 1/1965 | Swenson | 99/453 X |
| 3,329,079 | 7/1967 | Palm | 99/453 X |
| 3,601,288 | 8/1971 | Berry | 141/146 X |
| 3,702,625 | 11/1972 | Schmidt | 141/1 |

*Primary Examiner*—Wayne A. Morse, Jr.
*Attorney, Agent, or Firm*—Kenyon & Kenyon Reilly Carr & Chapin

[57] ABSTRACT

Apparatus for conditioning food products. The apparatus comprises a frame, a plate located at an upper level and supporting the receptacles to be filled and a rotary proportioning assembly driving the receptacles and filling the latter by means of a proportioning device, a distributing device and a device for discharging the product into the receptacles, and an enclosure which is sealed with respect to the atmosphere and the bottom of which is formed of said plate, said proportioning and distributing devices being located below the plate, and the edges of the plate opening, through which the discharging device is connected with the distributing device forming with the latter a fluid-tight rotary joint.

11 Claims, 14 Drawing Figures

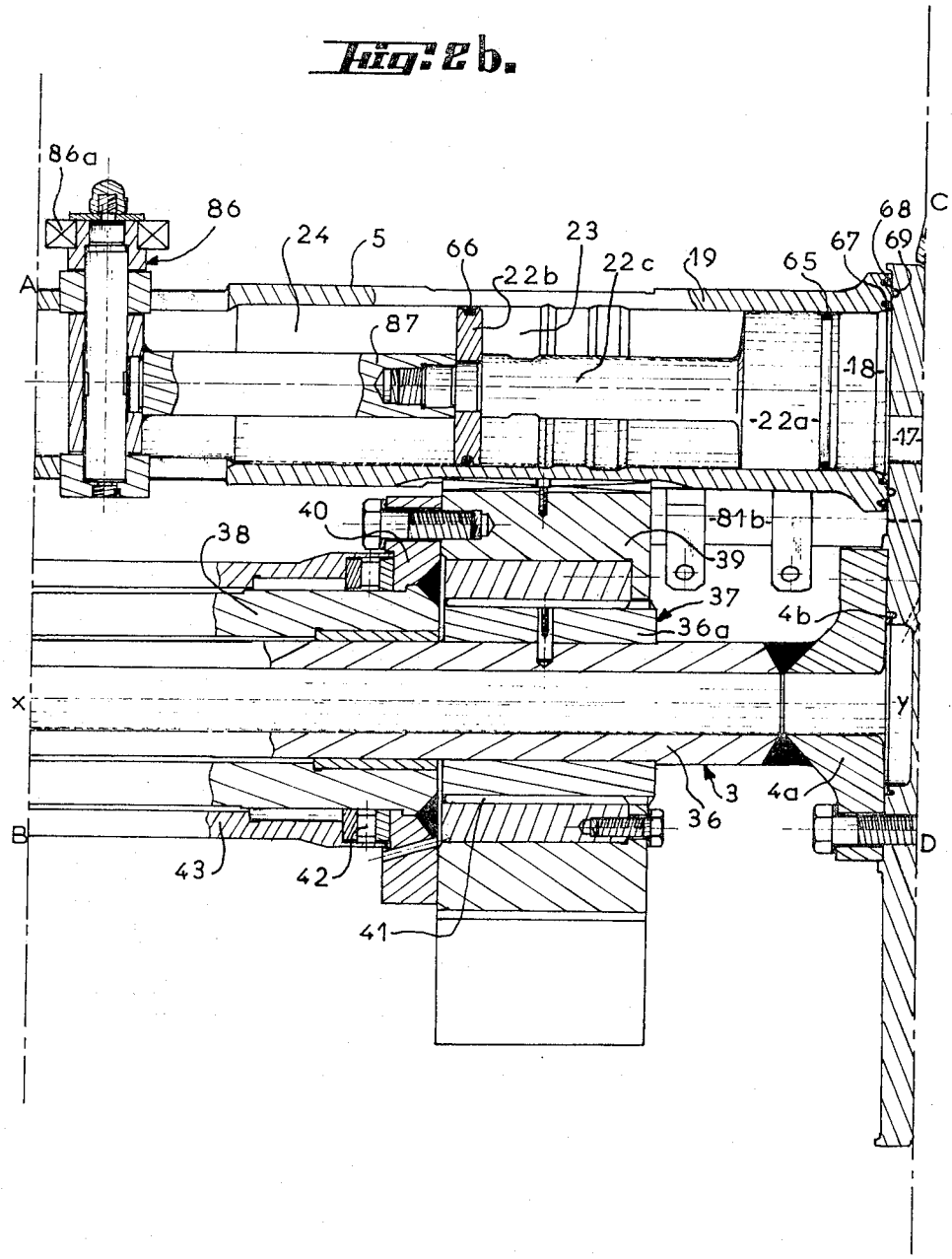

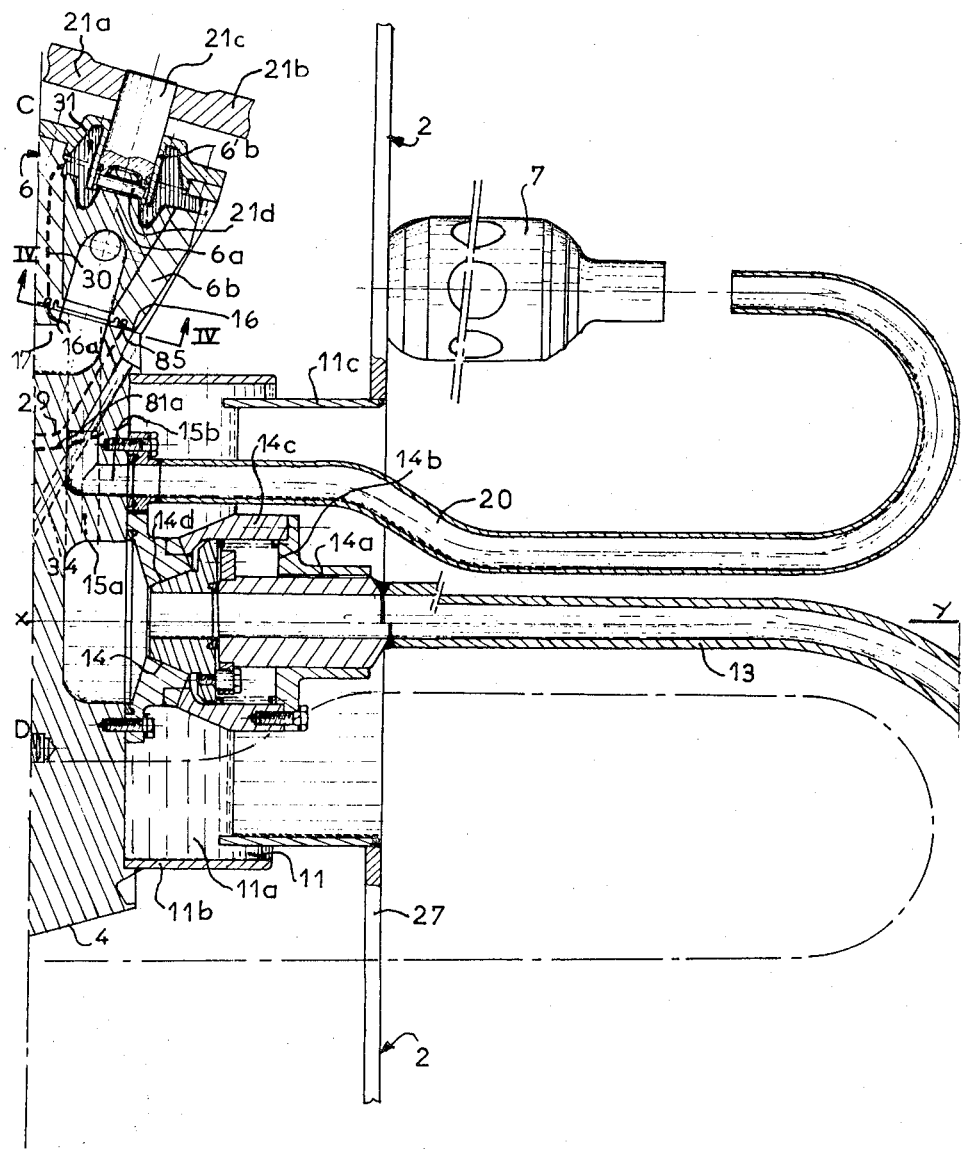

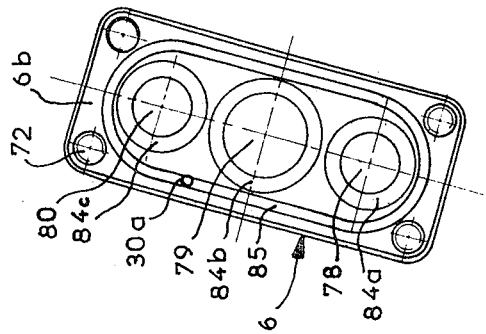
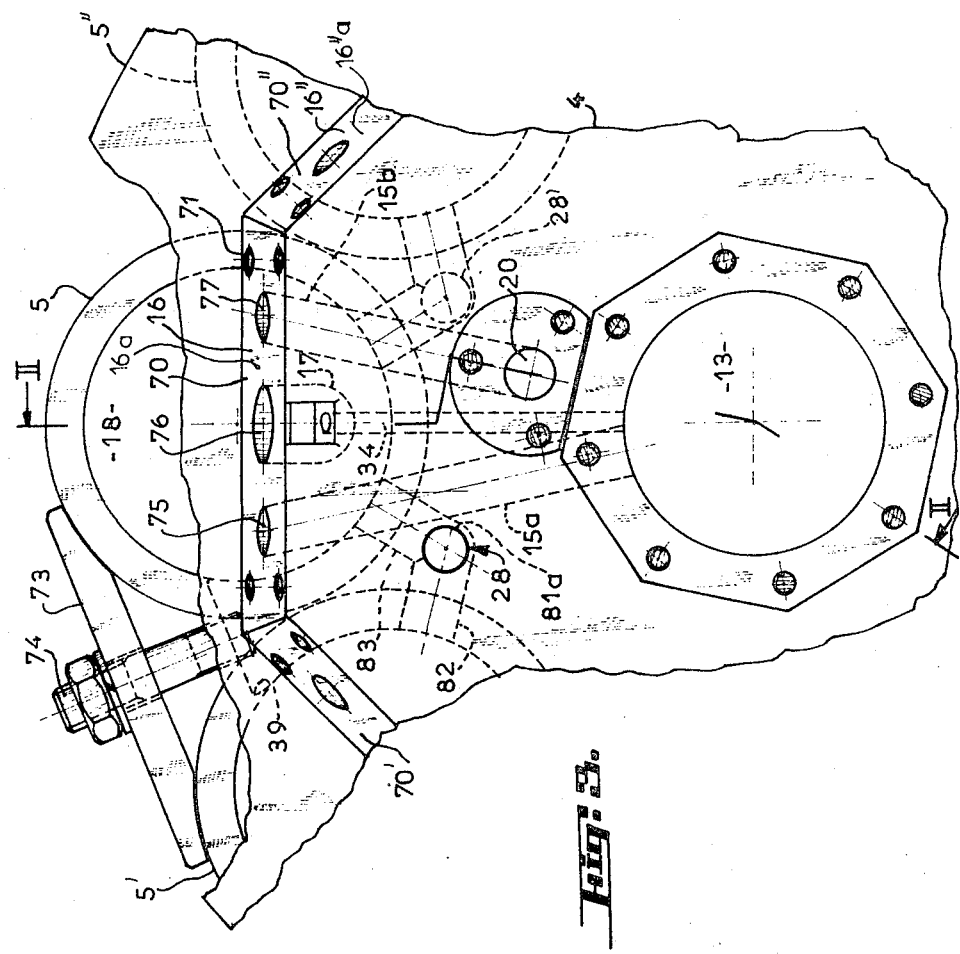

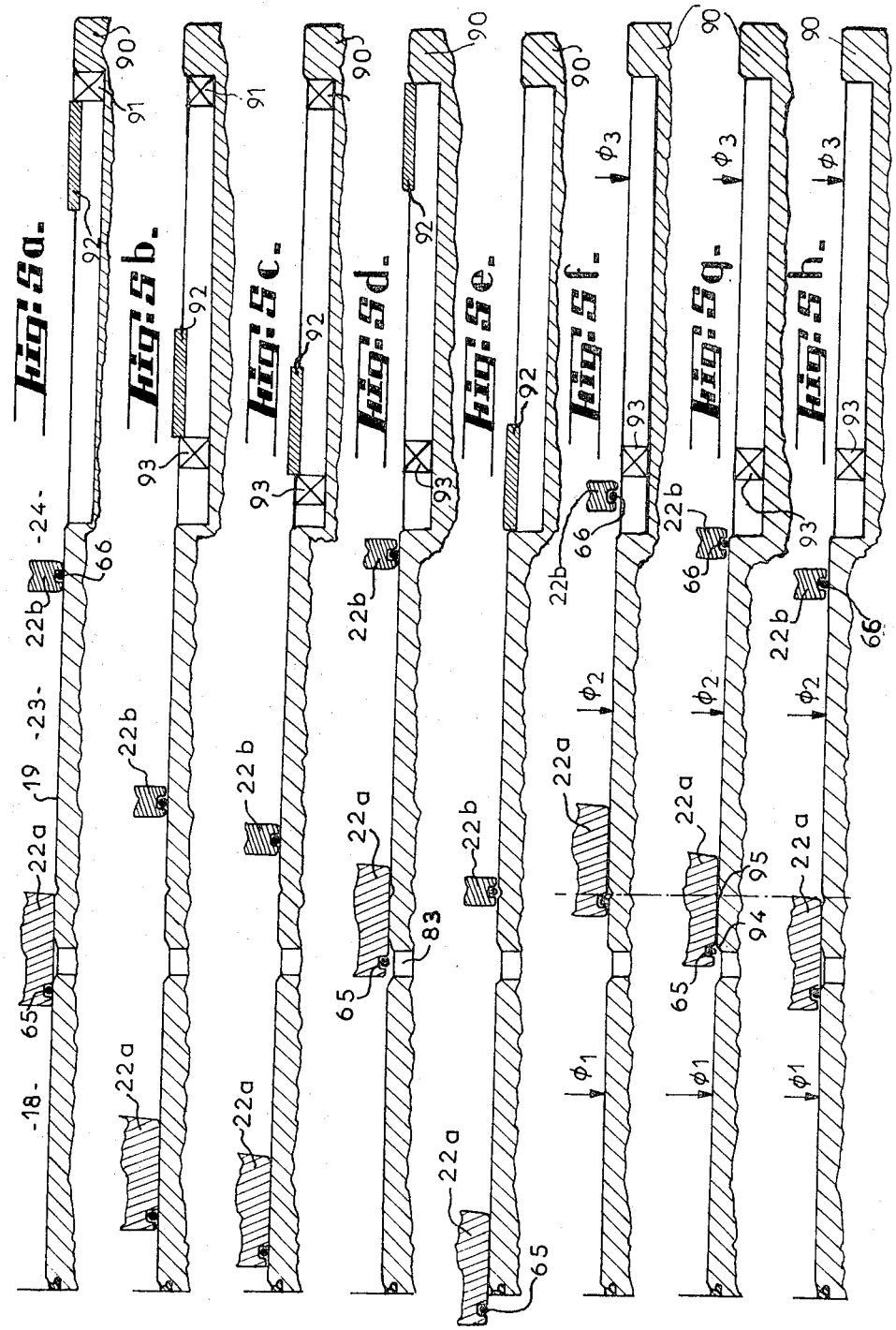

APPARATUS FOR ASEPTIC PACKING OR CONDITIONING OF PRODUCTS, NOTABLY FOOD PRODUCTS

The present invention has for its object an apparatus for aseptic packing or conditioning of various products, especially food products and more particularly milk products such as for instance milk.

The packing or conditioning apparatuses used at present do not allow the packing or conditioning operation to be carried out under conditions ensuring an aseptic state of the product packed or conditioned, especially when volumetric dispensing or proportioning is to be performed. Indeed, as described in U.S. Pat. application Ser. No. 165,266 filed on July 22, 1971 by the Applicant, for a "Method of aseptic packing or conditioning of any product, in particular a food product", a certain number of conditions have to be met in order to ensure the said aseptic state: use of an initially sterile product and an internally sterile, closed receptacle (which will be opened immediately before being filled), preservation of the aseptic state of the said product and the said receptacle during the operations and handlings required for the packing or conditioning (especially during the cutting off of the necks of the closed receptacles, the filling of the said receptacles and the sealing of the latter). The method of aseptic packing or conditioning disclosed in the said patent application meets all the said conditions, the said method comprising the use of a previously sterilized enclosure maintained sterile and containing devices for the transfer, opening, filling and closing of the said receptacles and involving external sterilization of the said receptacles during their introduction into said enclosure.

The apparatus according to the present invention enables sterile packing or conditioning of any products, especially under the conditions of the above-mentioned method, the said packing or conditioning being carried out with maximum efficiency as will appear from the following description, owing mainly to the fact that almost all the elements of the various devices required for the carrying out of the aforesaid operations and handlings are located outside the sterile enclosure. Such a feature involves basic modifications in the conventional packing or conditioning apparatuses wherein almost all the said elements are located above the receptacle, so that, should the said conventional apparatuses be used, the carrying out of the said method would lead to considerable difficulties in obtaining and preserving the sterile state of the enclosure and its contents, owing to the multiplicity and complexity of the devices which would then be included in such an enclosure.

Before describing the specific features of the apparatus according to the present invention, it is specified that it has the following general features in common with certain conventional packing or conditioning apparatuses: presence of a frame at a lower level, of a plate located at an upper level and supporting the receptacles to be filled, and of at least one rotary proportioning device or table supported by the said frame, driving the said receptacles and filling them with a predetermined volume of product by means of at least one proportioning device (notably a pump), at least one distributing device and at least one device for discharging the sterile product into the receptacle, the said proportioning, distributing and discharging devices being constituent parts of the said proportioning device.

According to an essential feature of the present invention, the said apparatus comprises an enclosure which is sealingly closed with respect to the external atmosphere and the bottom of which forms the said plate, the said proportioning and distributing devices being located outside the said enclosure, below the said plate, and the edges of the plate opening through which the discharging device is connected with the distributing device form with the latter a fluid-tight rotary joint.

According to another feature of the invention, the said fluid-tight rotary joint comprises a liquid bath forming a hydraulic joint, the said bath being either stationary and carried by an element of the said plate or movable in rotation and carried by an element of the said distributing device.

According to another feature of the invention, the wall of the said enclosure is formed of two parts interconnected by a stationary hydraulic joint, the lower part comprising the said plate and being traversed by the duct for the supply of the product from a storage device located outside the enclosure, which duct is connected through the interior of the said enclosure and through the said stationary hydraulic joint with the distributing device; preferably, the upper part has the shape of a cupola, dome or the like, the lower horizontal edge of which is connected with the said plate through the medium of the said stationary hydraulic joint, so as to render the said upper part removable; of course, if it is desired to provide ducts which must open into the interior of the enclosure, the said ducts advantageously pass through the plate so as to facilitate the removal of the upper portion of the enclosure.

According to another feature of the present invention, the said rotary hydraulic joint as well as the other hydraulic barriers or joints which will be described later are permanently supplied during normal operation of the apparatus with an auxiliary antiseptic fluid preventing any pollution at the level of the said joint.

Thus, according to a feature of the invention, the pump piston comprises two elements forming elementary pistons rigidly interconnected, for instance by means of a rod, so as to define between themselves an annular cylindrical safety chamber supplied with the said auxiliary antiseptic fluid, thus enabling a fluid-tight and sterilizing barrier to be produced between the cylinder chamber of the pump used for the product to be packed or conditioned and the external atmosphere. Permanent antiseptic cleaning of the internal wall of the pump cylinder chamber may thus be performed, this cleaning being indispensable owing to the fact that the product to be packed or conditioned, owing to the displacement of the upper element of the piston, comes into contact with portions of the said wall which are likely to be contaminated.

According to another feature of the invention, the switching members of the distributing device, called hereinafter "movable members", are protected against the risks of pollution from the external atmosphere by a hydraulic joint supplied with the auxiliary antiseptic fluid.

According to another feature of the invention, the hydrostatic head of the auxiliary antiseptic fluid is lower than the hydrostatic head of the liquid to be packed or conditioned, so that in case of casual communication between the circuit of the auxiliary fluid and that of the said liquid, leakage can take place only in the direction from the liquid to be packed or conditioned to the auxiliary fluid and not in the reverse direction. Preferably, the hydrostatic head of the said auxiliary antiseptic fluid corresponds substantially to the level of the plate and the hydrostatic head of the liquid to be packed or conditioned corresponds to a level slightly lower than that of the outlet orifice of the discharging device, which orifice is located above the opening of the receptacle placed on the plate. An advantageous arrangement consists in supplying with auxiliary antiseptic fluid the whole set of barriers and hydraulic joints by means of the rotary hydraulic joint.

Other features and advantages of the invention will appear as the following description proceeds.

In the appended drawings given solely by way of example:

FIGS. 2a, 2b, 2c show an axial longitudinal sectional view of the proportioning device or table of the apparatus according to a preferred form of embodiment of the invention;

FIG. 3 is a diagram showing how a plurality of pumps may be secured to the intermediate assembly of the proportioning device or table of FIG. 2, the means for supplying the said pumps with auxiliary antiseptic fluid being also shown in this Figure;

FIG. 4 is a top view, according to IV-IV of FIG. 2c of the interface between the switching-member bodies and the proportioning device body of the apparatus of FIG. 2;

FIGS. 5a to 5h show a partial longitudinal axial sectional view of the inner wall of the pump cylinder and the double piston of the latter, in the form of embodiment of FIGS. 2a to 2c, with various positions of the double piston within the said cylinder.

Figure 1:
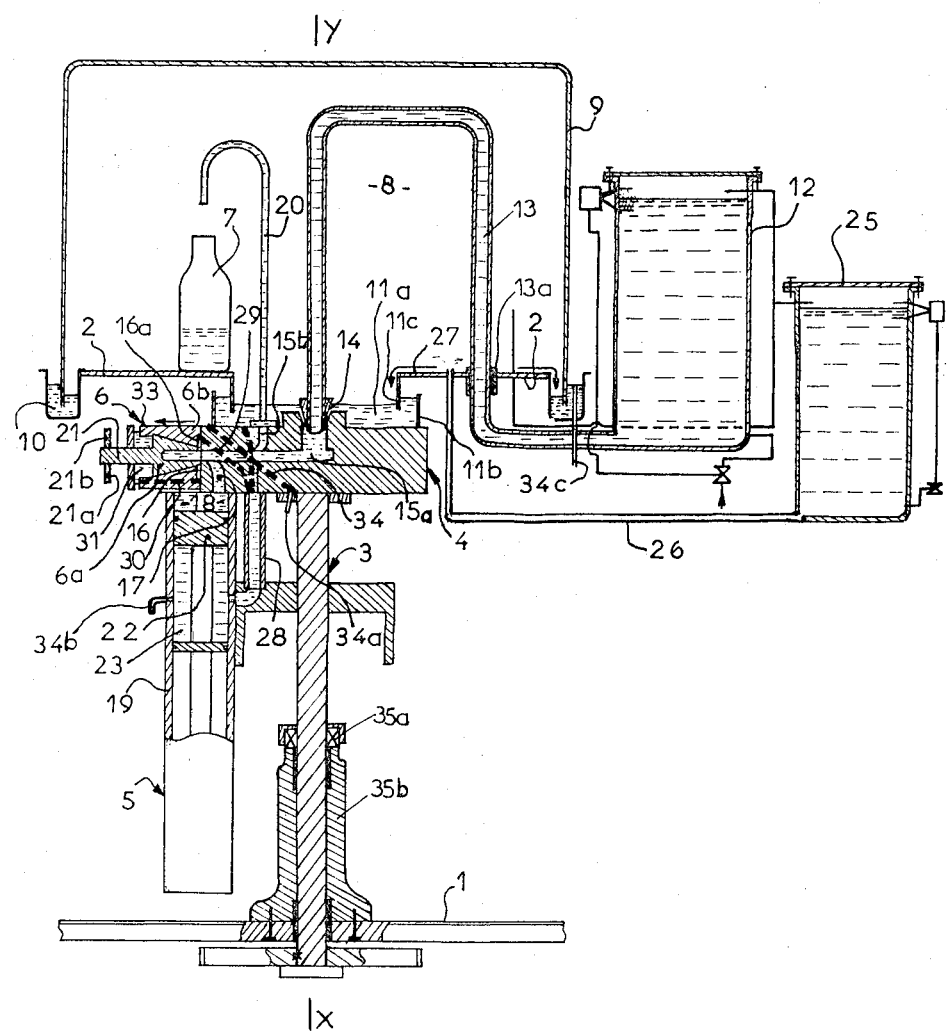
FIG. 1 is a basic diagram of an apparatus according to one form of embodiment of the present invention.

As seen in FIGS. 1 and (2a, 2b, 2c), the apparatus according to the present invention comprises a frame 1 located at a lower level, a plate 2 located at an upper level and a rotary proportioning device or table generally indicated at 3 and movable in rotation about the vertical axis XY. The said proportioning device comprises notably a rotary table block or body 4, one or several vertical axis pumps 5, a multi-channel valve 6 for the supply of the pump 5 or of the said pumps with the product to be packed or conditioned, i.e. to be conveyed into the receptacle 7 which is driven, by any suitable means, in rotation about the axis XY by the proportioning device, the said receptacle sliding for instance on the plate 2; according to a modification, the said receptacle may rest on a rotary plate solid with the proportioning device or rotating at the same speed as the latter about the same axis of rotation.

The packing or conditioning is performed in the enclosure 8 which is defined by a cupola, dome or the like 9, by the plate 2, by the stationary hydraulic joint 10 and by the rotary hydraulic joint 11, the hydraulic joint 10 is constituted by a peripheral groove connected with the plate 2 and contains the same auxiliary fluid in which is immersed the lower edge of the cupola 9. The rotary hydraulic joint 11 is constituted by a hydraulic bath 11a contained in a pan 11b and carried by the rotary device body 4, the edge 11c of the opening of the plate 2 through which the upper portion of the rotary proportioning device passes being immersed in the peripheral part of the said hydraulic bath 11a.

The product to be packed or conditioned, for instance milk, is stored in the sterile state in a receptacle shown diagrammatically and indicated at 12, which receptacle is located outside the enclosure and is connected to the proportioning device by a supply duct 13 which is stationary and sealingly passes through the plate 2 through a suitable opening 13a of the latter, the downstream portion of the supply duct 13 being located on the axis of rotation XY of the proportioning device and being connected with the latter by successively cylindrical, plane, cylindrical and cone-shaped bearing surfaces, respectively, 14a, 14b, 14c and 14d (FIG. 2c), constituting a rotary joint indicated generally at 14. This supply duct communicates with a sucking duct 15a provided within the proportioning device body 4 and opening on the interface 16 between the proportioning device body and the switching-member bodies. On the interface 16 also open a delivery duct 15b provided within the proportioning device body and a sucking and discharging conduit 17 ensuring alternate operating connection of the said conduit 15a and 15b with the chamber 18 of cylinder 19 of pump 5 which is used for the product to be packed or conditioned; the delivery conduit 15b communicates in its upstream portion with a delivery pipe 20 which passes through the hydraulic bath 11a and which, subsequent to an ascending path, bends and then opens right above the opening of the receptacle 7 at a level slightly below the free surface of the product contained in the receptacle 12.

The switching members 6 are three-channel members and comprise a plug 6a rotatably mounted within the body 6b, the rotation of this plug according to a reciprocating motion being controlled by two stationary stops solid with the frame 1 or the plate 2 and acting upon the said plug through the medium of the control lever or key 21, each of the said stops acting upon a predetermined arm 21a or 21b of the said key.

The sucking and discharge of the product to be packed or conditioned take place under the action of the displacement of the piston of pump 5, which is a double piston 22 constituted essentially by an upper element 22a and a lower element 22b interconnected by a rod or the like 23, which elements define a constant-height but variable-level cylindrical annular space 23, the said piston being driven in any manner known per se, for instance pneumatically or by means of a hydraulic fluid or by any means known per se, for instance by a mechanical system acting directly upon the double piston and controlled by cams, the said system being housed in the chamber 24 (FIG. 2b).

As appears from FIG. 1 and also from FIGS. 2, the apparatus also comprises an auxiliary antiseptic fluid circuit comprising notably an auxiliary liquid reserve 25 located outside the enclosure 2, a supply conduit 26 passing through the plate 2, grooves 27 provided on this plate for dividing the said fluid and distributing it on the one hand to the stationary hydraulic joint 10 of the enclosure and on the other hand to the rotary hydraulic joint 11 of the rotary proportioning device, a first conduit 28 supplied from the hydraulic bath 11a, passing notably through the body 4 of the rotary proportioning device and opening into the annular cylindrical chamber 23 of the pump, a second conduit 29 also supplied from the said chamber 23, passing through the body 4 of the rotary proportioning device and opening on the hydraulic barrier 16a of the interface 16, a third conduit 30 connecting the hydraulic barrier of the said interface with a hydraulic joint 31 provided between the plug 6a and the flange 6'b of the body 6b of the switching members, the body 6b and a fourth conduit 32 which is not shown in FIG. 1 for the sake of clarity but interconnects through the proportioning device body 4 the hydraulic bath 11a with an annular space provided on the interface between the body of the pump 5 and the proportioning device body 4 and defined by two concentric joints, the said joints and/or annular space being carried by the pump body and/or the proportioning device body. According to the invention, it is preferable to provide for circulation of the said auxiliary fluid in its circuit at a low supply and draw-off rate-of-flow, and to provide several locations of draw-off, so as to increase safety to a maximum and to dilute and/or discharge the pollutants possibly existing at the said locations, the following means being used to this end:
- at the level of the hydraulic joint 31 of the switching members 6: an external overflow-discharge groove 23, a discharge conduit 34–34a passing through the rotary proportioning device body 4 and opening outside the enclosure 8 into the external atmosphere
- at the level of the annular cylindrical chamber 23 of the pump: a small closable discharge conduit 34b
- at the level of the stationary hydraulic joint 10 of the enclosure: a small discharge conduit 34c.

In FIG. 1 at 35a and 35b there are shown means for supporting and guiding in rotation the proportioning device 3, whereas at 35c there is shown a pinion for driving the said proportioning device in rotation, the elements 35a and 35b being carried by the frame 1.

The structure of the proportioning device 3 will now be described more in detail with reference to FIGS. 2a, 2b, 2c only.

The rotary proportioning device 3 comprises a central vertical hollow shaft 36 welded to the plate 4a which is itself screwed into the body 4 of the proportioning device, a joint 4b being interposed between the plate 4a and the body 4; the central shaft 36 is surrounded by an intermediate assembly indicated generally at 37 and comprising an intermediate shaft 38 and a pump support plate 39 rigidly connected with the intermediate shaft 38 by means of a ring 40 welded to the said intermediate shaft and secured by screws to the said support plate. The intermediate assembly 37 is rendered solid in rotation with the central shaft 36 by means of a series of longitudinal splines provided respectively on the outer surface of a sleeve 36a secured to the said shaft and on the inner surface of the central bore of the support plate 39, the said splines being indicated at 41.

The intermediate assembly 37 is supported through the medium of roller stops 42 by a tubular base 43 made solid with the frame 1 by screws such as 43A; a bearing bush 44 interposed between the said base at the intermediate shaft 38 also fulfills the function of a stop preventing the upward motion of the intermediate shaft 38, owing to the fact that the pinion 45 driving the proportioning device in rotation abuts against the bush 44 under the action of a clamping nut 46 and a locking nut 47 of the pinion 45.

The lower portion of the central shaft 36 is provided with a thread 48 onto which are screwed a clamping nut 49 and a lock nut 50, the said nuts being respectively solid with a clamping pinion 51 and a lock pinion 52 through the medium of screws such as, respectively, 53 and 54. The clamping nut 49 is solid, through the medium of screws such as 55, with a sleeve 56 provided at its upper portion with an annular flange 56a projecting internally and penetrating with a small play into an annular groove 57 of the intermediate shaft 38, thus enabling the clamping nut 49 to be maintained at a constant height; the screw-and-nut assembly constituted by the nut 49 and the central shaft 37 thus operates in such a manner as to raise or lower, during the driving in rotation of the clamping nut 49, the said central shaft 36 as well as the rotary body 4 carried thereby, thus enabling the latter to be connected with or disconnected from the pump 5 which is rigidly secured to the support plate 39. A roller stop 59 is arranged between this nut and the lower portion of the intermediate shaft 38, thus enabling the clamping stress exerted by the body 4 on the pumps to be supported.

The mechanism for driving the clamping pinion 51 and the lock pinion 52 is indicated generally at 60. The body of this mechanism is secured to the frame 1 by screws; the said mechanism is constituted essentially by two concentric shafts 61 and 62 driving respectively pinions 63 and 64 meshing with, respectively, the clamping pinion 51 and the lock pinion 52; the said shafts end at their upper portions with heads which can be actuated in rotation by means of a key or like tool, the said heads being provided to this end with vertical flat surfaces, for instance six flat surfaces as shown in FIG. 2, the head 61a ending the outer shaft 61 thus actuating the clamping nut 49, whereas the head 62a provided with six flat surfaces and ending the shaft 62 actuates the lock nut 50; these heads may be actuated by means of keys separately, or they may be driven at the same time and by the same angle of rotation by means of a single key acting upon only one of the heads, by fitting on the latter a removable connecting element rendering the heads 61a and 62a solid with one another.

FIG. 2b also shows the respective joints 65 and 66 of elements 22a and 22b of piston 22, as well as the two coaxial joints 67 and 68 of the face by which the pump cylinder 19 bears upon the lower face of the rotary body 4, which lower face is provided with an annular groove 69 limited by joints 67 and 68, the annular space defined by this groove, these joints and the confronting surface of the pump cylinder being supplied with the auxiliary antiseptic fluid mentioned above, by means of a conduit (not shown) proceeding from the hydraulic bath 11a and passing through the rotary body 4; any risk of pollution of the product being packed or conditioned is thus avoided at the level of the junction between the said pump and rotary body.

Figure 2A:
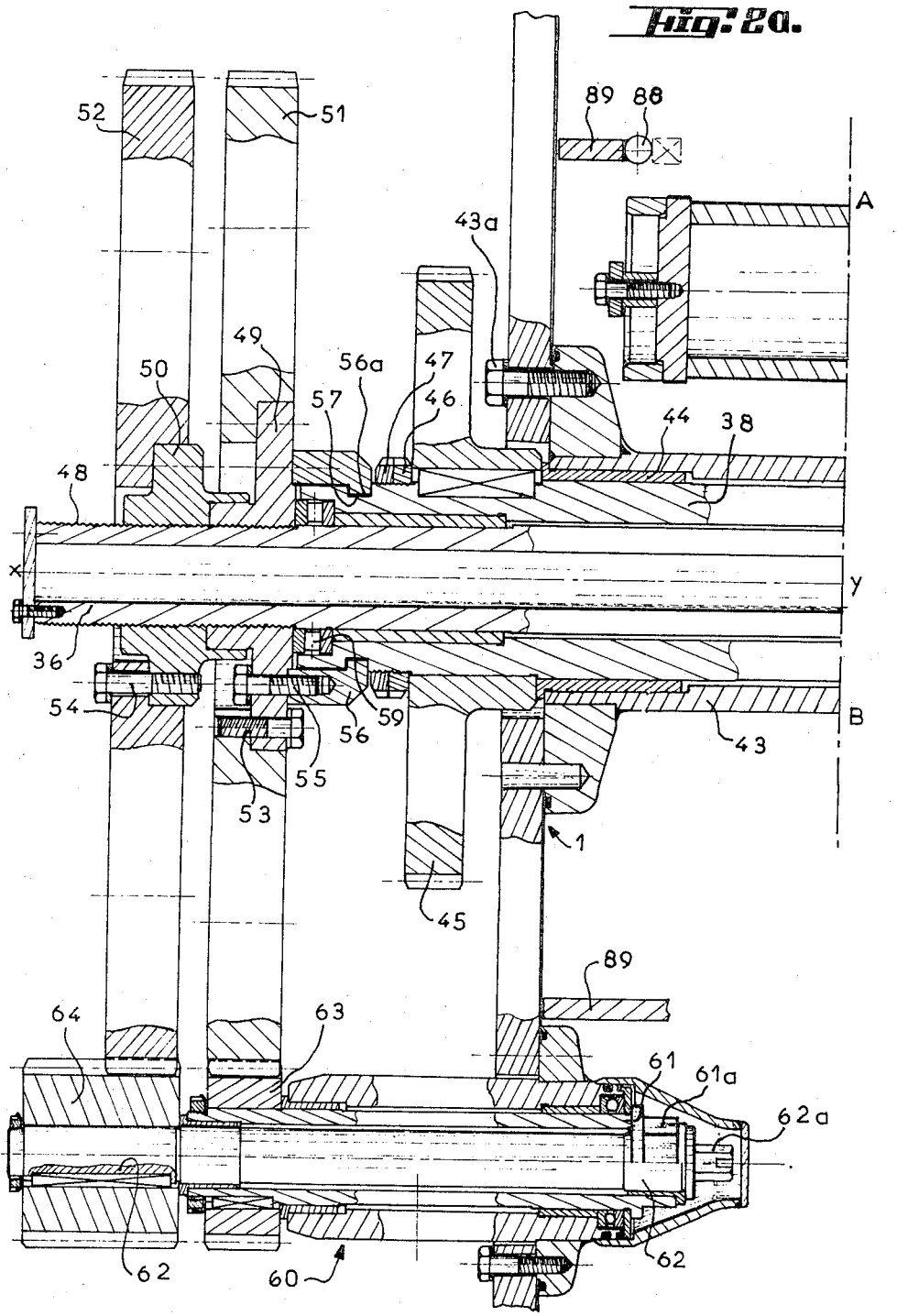

As appears from FIGS. 2a, 2b, 2c, the coaxial joints 67 and 68, as well as other joints, have an L-shaped structure offering the specific features and providing the particular advantages described in U. S. Patent application Ser. No. 167,308, filed on July 29, 1971 in the name of the applicant, for: "Sealing gasket and sealed joint using the said gasket".

In the top view of the proportioning device 3 which is illustrated in FIG. 3, instead of a single pump 5 there are shown three pumps 5, 5' and 5'', it being understood that the rotary proportioning device of FIG. 3 corresponds to a symmetrical arrangement of these pumps which, therefore, are eight in number (in FIGS. 1 and 2, a single pump is shown for the sake of clarity).

In FIG. 3 are shown the oblique bearing surfaces such as 70, 70' and 70'' of the body 4 of the proportioning device, which constitute the interfaces, such as 16, of the switching member bodies and the proportioning device body, as already mentioned in connection with FIG. ; each of the said interfaces contains four tapped holes such as 71 serving to secure plug switch-members such as 6, the body 6b of which is provided with four corresponding holes 72 (see FIG. 4; in FIG. 3, the switching members such as 6 are not shown). The pump bodies 5, 5', 5'' etc... are set in cylindrical recesses or hollows arranged at the periphery of the support plate 39 and are retained in the said recesses by flanges such as 73 which are held so as to bear upon the outer face of the pump bodies by means of studs 74. FIG. 3 clearly shows the base of the duct 13 for the supply of the product to be packed or conditioned, the setting duct 15a connecting the latter with the opening 75 of the oblique bearing surface 70, the sucking and discharging conduit 17 connecting the central opening 76 of the said oblique bearing surface with the working chamber 18 of the pump (FIG. 2b) and the delivery conduit 15b connecting the opening 77 of the oblique bearing surface 70 with the base of the delivery pipe 20. The said openings communicate respectively with the openings 78, 79 and 80 of the plug 6a (see FIGS. 2c and 4). FIG. 3 also shows the first conduit 28 for the auxiliary fluid supplied into the annular cylindrical chambers such as 23 of the pumps, the said first conduit comprising a portion 81a which passes through the proportioning device body 4 and which is continued by a vertical channel 81b subdivided into two channels 82 and 83 supplying the annular cylindrical chambers of the pumps, respectively, 5 and 5'the following, similarly arranged conduit 28' receives the auxiliary fluid from the annular cylindrical chambers of the pumps 5 and 5'' to supply the second conduit 29 which itself supplies the hydraulic barriers 16a and 16''a, respectively, of the interfaces 16 and 16''.

Referring again to FIGS. 2a, 2b, 2c and 4, it is seen that the face of the valve body placed at the interface 16 is provided with a groove 85 in which are located the openings 78, 79 and 80 around which are respectively adapted joints 84a and 84b and 84c; this groove defines the hydraulic barrier recess mentioned above, the said groove being supplied with auxiliary antiseptic fluid by the second conduit 29 (FIG. 1), the said groove serving, through the opening 30a, the third conduit 30 serving the hydraulic joint 31 (FIG. 2c).

Referring again to FIGS. 2a to 2c, it is seen that the body 6b of the switching members end outwardly with a portion forming a flange or sleeve 6b' which is sufficiently elongated to ensure reliable guiding of the rod 21c of the lever or key 21 solid in rotation with the plug 6a owing to the transverse axis 21d, so that the swinging effort transmitted by the aforesaid stops to the arms 21a and 21b is not transmitted to the plug 6a, to which only the torque is transmitted; as a result, the said plug is not put out of true and is always so seated as to ensure the required fluid-tightness.

A portion 86 of the control mechanism of the pump 5 is also shown in FIG. 2b, the roller 86a of the said portion being adapted to slide on a stationary guide 88–89 forming a closed circuit about an axis XY, solid with the frame 1 and having an appropriate profile, so that the roller 86a and the portion 86 to which it is connected are displaced vertically by sliding along the cylinder 19 of the pump 5 and driving the rod 87 of the double piston 22.

In FIGS. 5a to 5h there is shown a lower stationary stop 90 above which is secured an additional removable stop 91, the said stops being adapted to co-operate with a key 92 solid with the rod 87 of the double piston 22, the said key moving in an appropriate groove of the lower portion (not shown in FIGS. 5a to 5h, but seen FIG. 2b) of the pump body; in the higher position of the double piston, the said key bears upon an upper stop 93, which may be movable. During normal operation, the stop 91 is positioned and determines the lower position of the double piston, which lower position is the one shown in FIG. 5a and is the same whatever the volume of the product to be packed may be. FIG. 5b shows the double piston in its upper operating position, for a proportioned volume of one litre, the key 92 then being in contact with the upper stop 93. If it is desired to modify the proportioned volume and increase it to, for instance, 1.17 litres (¼ of a gallon), the upper stop 93 is displaced to the position illustrated in FIG. 5c which shows the upper position of the double piston in this case, the lower position of the said piston remaining unchanged; otherwise stated, this lower position is the same whatever the volume to be proportioned may be.

As appears from FIGS. 5a to 5c, the paths of the joints 65 and 66 do not overlap one another, so that the regions of the wall of the cylinder 19 which only at certain moments are in contact with the product to be packed or conditioned are at other moments in contact only with the auxiliary antiseptic fluid but never with the medium located below the piston element 22b.

FIG. 5d corresponds to a cleaning position of the joint 65 of the piston element 22a, a position wherein the additional stop 91 is withdrawn, the key 92 being then in contact with the lower stop 90; in this exceptional lower position of the double piston, the joint 65 and its recess are brought opposite the auxiliary antiseptic fluid supply channel 82 or 83 supplying normally the annular cylindrical space 23, thus enabling efficient cleaning of this region to be performed.

In the state illustrated in FIG. 5e, the upper stop 93 is removed and the key 92 is in contact with the shoulder of the inner wall of the cylinder 19; thus, after raising the rotary block 4 (FIGS. 2), the upper portion of the element 22a may be withdrawn from the cylinder 19, so as to have access to the joint 65 and its recess in order to verify the state of this joint and replace it in case of need without having to carry out a more complete disassembling of the pump.

FIGS. 5f to 5h illustrate three stages of the mounting of the double piston in the pump cylinder. The groove 95 divides the cylinder into three portions having unequal parameters, the lower portion being provided with a bore $Q_3$ greater than the bore $Q_2$ of the medial portion, which is itself greater than the bore $Q_1$ of the upper portion. In FIG. 5f, only the joint 65 of the upper element 22a is tightly engaged in the pump cylinder, since the joint 66 is still the lower portion whose diameter is $Q_3$.

In FIG. 5g, the joint 65 is temporarily disengaged before the joint 66 is tightly engaged into the $Q_2$ diameter portion. The joint 65 is then located opposite a peripheral groove 94. It will be noted that the groove 94, which necessarily has a considerably flared wall, is machined at the level of the conduit 83; in this position, the joint 65 is already in the upper portion, having the smaller inner diameter $P_2$, of the cylinder 19, which begins at the level of the disengagement groove 95, the better guiding of the piston ensured simultaneously by the upper and lower elements of the said piston enabling the element 22a to be introduced with sufficient easiness into the said upper portion of the cylinder.

FIG. 5h shows one stage of introduction of the piston into the cylinder 19 after the passing of the joint 65 beyond the peripheral groove 94, the joint 66 being already tightly engaged so as to ensure correct guiding of the piston.

The operation and advantages of the proportioning apparatus according to the present invention clearly appear from the preceding description. The operation will now be described briefly;

- after mounting the rotary proportioning device on the frame 1, the rotary device body 4 is tightened and locked against the various pumps to this end, the locking pinion 52 and the clamping pinion 51 are jointly driven in rotation by means of the above mentioned connecting element fitted between the head 62a and the head 61a and by giving an appropriate turn by means of a key fitted on the head 62a, thus enabling the lower face of the rotary body 4 to be applied against the joints 67 and 68; the said connecting element is then removed and the head 62a alone is given one turn by means of the said key, thus enabling only the locking pinion 52 to be actuated, so that the clamping nut 49 is locked by the locking counter-screw 50 and thus the lower face of the rotary body 4 is locked against the pumps
- the enclosure 8 is sterilized once for all, for instance by the method described in american Patent application Ser. No. 155 420 filed on June 22, 1971 in the name of the Applicant, for a "Method of sterilizing industrial product-dispensing plants"; certain parts of the aforesaid auxiliary fluid circuit may be used for this sterilizing operation;
- the whole of the previously described circuit is then supplied with antiseptic hydraulic fluid, thus completely isolating the enclosure 8;
- the rotary device 3 is then driven in rotation by means of a driving device (not shown) acting upon the driving pinion 45;
- the receptacles 7 to be packed or conditioned are thereafter introduced continuously into the enclosure, for instance by means which do not form part of the present invention and have already been described by the Applicant in U. S. patent application Ser. No. 165,266, filed on July 22, 1971 for a "Method of aseptic packing or conditioning of any product, in particular a food product", the said receptacles being closed and internally sterile before their introduction into the enclosure, whereas they are sterilized externally during their introduction into the said enclosure.

In the latter, the necks of the said receptacles are cut off, the latter being made from an appropriate plastics such as polyethylene.

The receptacles are then successively taken by the star of the rotary proportioning device and are driven thereby while at the same time being filled owing to the actuation of the pump piston under the action of the guide 88 acting upon the roller 86a and to the actuation of the plug valve 6, the alternate rotations of which are controlled by a lower concealable stop in order to allow the machine to be rotated, even if there is no receptacle, in which case the proportioned product is not delivered in order not to be lost, and by an upper stationary stop, the said stops pushing respectively the arms 21b and 21a of the key of plug 6a.

More specifically, the sucking and delivery take place in the following manner: during the descending motion of the double piston 22, the product to be conditioned, supplied by the duct 13, is sucked into the sucking conduit 15a and conveyed into the plug which is so positioned that the sucking conduit 15a communicates with the sucking and discharging conduit 17: a maximum amount of liquid is thus introduced into the chamber 18; when the double piston 22 begins to rise, the plug rotates by half a turn under the action of one of the two aforesaid stops, thus disconnecting the conduit 17 from the conduit 15a and interconnecting the conduit 17 and the delivery conduit 15b; while the double piston rises within the cylinder 19 up to a predetermined height, the level of which depends upon the volume to be conditioned, the product is delivered into the conduit 15b and then into the delivery pipe 20 opening above the receptacle 7 which is then filled with the desired volume of product; at that moment, i.e. when the piston is in its upper position, the plug is rotated by half a turn in the opposite direction under the action of the other stationary stop, thus disconnecting the conduit 15b from the conduit 17, whereas the conduit 15a and the conduit 17 are interconnected and a further filling cycle begins, the same pump 5 then filling a further receptacle 7;

- of course, if use is made, as shown in FIG. 3, of a plurality of pumps (as is the case in practice), for instance eight pumps, each pump such as 5 fills one receptacle out of eight; the operating angles of each of the pumps are then shifted by one eighth of a turn, thus resulting in a similar shifting of the filling cycle of the eight receptacles simultaneously driven by the rotary proportioning device.

Of course, the invention is by no means limited to the form of embodiment described and illustrated which has been given by way of example only. In particular, it comprises all the means constituting technical equivalents to the means described as well as their combinations, should the latter be carried out according to the spirit of the invention.

What is claimed is:

1. Apparatus for delivering a liquid product, such as a milk product under sterile conditions into receptacles comprising: a stationary frame located at a base level of said apparatus; a stationary tubular base secured on said frame; a stationary plate to receive said receptacles, said stationary plate being located above said base level having an opening; removable cover means overlying said stationary plate to define therewith an enclosure; a stationary hydraulic seal interconnecting said cover means and said stationary plate and a rotary hydraulic seal at said opening for sealingly closing the latter, whereby said enclosure is sealed with respect to the external atmosphere; a storage container located outside said enclosure and containing the product to be delivered; a rotary proportioning device supported on said stationary frame and located below said enclosure, said device delivering to each one of said receptacles a predetermined volume of said product, said proportioning device comprising: a rotary intermediate assembly comprising an intermediate tubular shaft mounted within said stationary tubular base in coaxial relationship with the latter, and a support plate member secured to said intermediate shaft, said support plate member being rotatably supported on the upper end of said tubular base, a rotary central shaft mounted within said intermediate shaft in coaxial relationship with the latter, a rotary body secured on said central shaft and provided with at least one internal product sucking duct communicating with said storage container, at least one internal product delivery duct and at least an internal product discharging conduit, said rotary body being located below said stationary plate in alignment with said opening and carrying said rotary hydraulic seal, at least one switching member carried on said rotary body to establish a communication alternatively between said product sucking duct and said product discharging conduit or between said product discharging conduit and said product delivery duct, hydraulic seal means and hydraulic barrier means for said switching member, at least one proportioning pump carried on said support plate member and having a product chamber, said chamber having an open end communicating with said product discharging conduit, said pump also having an annular chamber to receive an antiseptic fluid, means for connecting said intermediate shaft to said central shaft, said connecting means causing said shafts to rotate jointly while allowing a linear displacement of one of said shafts with respect to the other, said displacement entailing a corresponding linear displacement between said rotary body and said pump, at least one delivery pipe carried on said rotary body and communicating with said product delivery duct, said delivery pipe passing through said rotary hydraulic seal and being located within said enclosure; and an antiseptic fluid circuit comprising: an antiseptic fluid reserve located outside of said enclosure, supply means communicating with said reserve and supplying both said stationary hydraulic seal and said rotary hydraulic seal with said antiseptic fluid and duct means for supplying said annular chamber, said hydraulic barrier and said hydraulic seal means of said switching member with said antiseptic fluid from said rotary hydraulic seal.

2. Apparatus according to claim 1 wherein said antiseptic fluid in said reserve has a hydrostatic head which is lower than the hydrostatic head of said product contained in said storage container so that, in case of casual interconnection between the antiseptic fluid supply means and the delivery device of the said product, contingent leakage can take place only in the direction from the product to the antiseptic fluid and not in the reverse direction.

3. Apparatus according to claim 1, wherein the said central shaft extends outwardly of the said intermediate shaft, and comprises a clamping nut screwed on a threaded portion of the said central shaft and means of abutment on the ssid stationary frame to prevent longitudinal displacement of the said intermediate shaft, so that upon rotation of said nut the said central shaft and the said rotary body may be displaced longitudinally in order alternatively to move the rotary body towards the pump and apply it tightly to the latter, or move it away from the said pump.

4. Apparatus according to claim 1, wherein said pump comprises a vertical cylinder located below said rotary body, said cylinder being provided at its upper portion with said product chamber, a double piston slidably mounted in said chamber for movement toward and away from said product chamber, said double piston comprising an upper element and a lower element rigidly interconnected with one another, said elements being each provided with a gasket and defining between themselves a space of constant distance but movable to variable levels, said space defining said annular chamber, and a supply conduit interconnecting said rotary hydraulic seal to said annular chamber to supply the latter with said antiseptic fluid whereby said annular chamber forms a sealing and sterilizing barrier between said product chamber and the external atmosphere.

5. Apparatus according to claim 4, wherein the path of the said piston is such that, during normal operation, the supply conduit of the said annular cylindrical chamber is never connected with said product chamber, and the paths of the elements of the said piston do not overlap one another.

6. Apparatus according to claim 4, wherein said pump comprises stationary stop means for determining the remotest position of said double piston relative to said product chamber of said cylinder and adjustable stop means for determining the nearest position of said double piston relative to said product chamber so as to vary the travel of said double piston toward said product chamber and thus vary the volume of product in said product chamber.

7. Apparatus according to claim 6 comprising means for providing additional upward displacement of said adjustable stop means, so that in one position the portion of the gasket carrying upper element projects outwardly of the cylinder for ready accessibility.

8. Apparatus according to claim 4, wherein said pump comprises stationary stop means for determining the remotest position of said double piston relative to said product chamber and a supply channel in said cylinder communicating with said supply conduit, said stationary stop means comprising a removable stop in whose absence when the double piston is in its said remotest position the gasket of its upper element lies in confronting relationship with said supply channel.

9. Apparatus according to claim 4, wherein said vertical cylinder comprises a higher portion, a medial portion and a lower portion, the inner diameter of said lower portion being slightly greater than that of said medial portion, whereat the said lower element of said double piston with its gasket moves during normal operation, and the inner diameter of said medial portion being slightly greater than that of said higher portion whereat the said upper element with its gasket moves during normal operation.

10. Apparatus according to claim 9 comprising a peripheral groove with considerably flared edges in the wall of the said higher portion of said cylinder at a distance from the lower end of the said medial portion thereof substantially equal to the spacing between said upper and lower elements of the double piston, so that the gasket of the upper element is located in confronting relationship with said groove when the gasket of the lower element begins to be engaged in the said medial portion.

11. Apparatus for delivering a liquid product, such as a milk product under sterile conditions into receptacles comprising: a stationary frame located at a base level of said apparatus; a stationary tubular base secured on said frame; a stationary plate to receive said receptacles, said stationary plate being located above said base and having an opening; removable cover means overlying said stationary plate to define therewith an enclosure; a stationary hydraulic seal interconnecting said cover means and said stationary plate and a rotary hydraulic seal at said opening for sealingly closing the latter whereby said enclosure is sealed with respect to the external atmosphere; a storage container located outside said enclosure and containing the product to be delivered; a rotary proportioning device supported on said stationary frame and located below said enclosure, said device delivering to each one of said receptacles a predetermined volume of said product, said proportioning device comprising: a rotary intermediate assembly comprising an intermediate tubular shaft mounted within said stationary tubular base in coaxial relationship with the latter, and a support plate member secured to said intermediate shaft, said support plate member being rotatably supported on the upper end of said tubular base, a rotary central shaft mounted within said intermediate shaft in coaxial relationship with the latter and extending outwardly thereof, said central shaft at its lower end having a threaded portion, a clamping nut screwed onto said threaded portion, a rotary body secured on said central shaft and provided with at least one internal product sucking duct communicating with said storage container, at least one internal product delivery duct and at least one internal product discharging conduit, said rotary body being located below said stationary plate in alignment with said opening and carrying said rotary hydraulic seal, at least one switching member carried on said rotary body to establish a communication alternatively between said product sucking duct and said product discharging conduit or between said product discharging conduit and said product delivery duct, hydraulic seal means and with hydraulic barrier means for said switching member, at least one proportioning pump carried on said support plate member and having a product chamber, said chamber having an open end communicating with said product discharging conduit, said pump also having an annular chamber to receive an antiseptic fluid, means for connecting said intermediate shaft to said central shaft, said connecting means causing said shafts to rotate jointly while allowing linear displacement of one of said shafts with respect to the other, said displacement entailing a corresponding linear displacement between said rotary body and said pump, abutment means on the said stationary frame to prevent longitudinal displacement of the said intermediate shaft and said clamping nut, so that on rotation of said clamping nut which is maintained at a constant level on said intermediate shaft, the said central shaft and the said rotary body received therein may be displaced longitudinally in order to alternatively move the rotary body towards the pump and apply it tightly to the latter, or move it away from the said pump, a counternut screwed on said threaded portion of the central shaft for locking said clamping nut, so as to maintain said rotary body locked on said pump after application of said body tightly to the said pump, pinion means on said intermediate shaft for driving said proportioning device in rotation, a clamping pinion concentric with and secured to said clamping nut, a first driving pinion meshing with said clamping pinion, a control mechanism for said driving pinion comprising a first manually operable polygonal element, a lock pinion concentric with and secured to said lock nut, a second driving pinion meshing with said lock pinion, a control mechanism for said second driving pinion comprising a second manually operable polygonal element, operation of said mechanisms serving respectively for desired rotation of the clamping nut and of the locking nut, at least one delivery pipe carried on said rotary body and communicating with said product delivery duct, said delivery pipe passing through said rotary hydraulic seal and being located within said enclosure and a circuit for antiseptic fluid comprising: a reserve for antiseptic fluid located outside of said enclosure, supply means communicating with said reserve and supplying both said stationary hydraulic seal and said rotary hydraulic seal with said antiseptic fluid and duct means for supplying said annular chamber, said hydraulic barrier and said hydraulic seal means with said antiseptic fluid from said rotary hydraulic seal.

\* \* \* \* \*